United States Patent [19]

Lowi, Jr.

[11] 4,342,200
[45] Aug. 3, 1982

[54] COMBINED ENGINE COOLING SYSTEM AND WASTE-HEAT DRIVEN HEAT PUMP

[75] Inventor: Alvin Lowi, Jr., San Pedro, Calif.

[73] Assignee: Daeco Fuels and Engineering Company, Wilmington, Calif.

[21] Appl. No.: 43,313

[22] Filed: May 29, 1979

Related U.S. Application Data

[63] Continuation-in-part of Ser. No. 631,023, Nov. 12, 1975, Pat. No. 4,164,850.

[51] Int. Cl.³ .............................................. F25B 1/06
[52] U.S. Cl. ..................................... 62/191; 62/238.4; 62/500; 60/599; 60/618; 417/191
[58] Field of Search .............. 62/191, 238 CX, 323 C, 62/500 X; 417/191, 197; 60/618, 599; 123/119 CD

[56] References Cited

U.S. PATENT DOCUMENTS

| | | | |
|---|---|---|---|
| 2,062,651 | 12/1936 | Hennig | 62/191 X |
| 2,327,451 | 8/1943 | Perrine | 62/238 C X |
| 2,353,966 | 7/1944 | Newcombe | 62/238 C X |
| 2,360,969 | 10/1944 | Newcombe | 62/238 R X |
| 2,404,778 | 7/1946 | Allison | 62/238 C X |
| 3,470,707 | 10/1969 | Lofgreen et al. | 62/238 C X |
| 3,500,897 | 3/1970 | Von Cube | 62/500 X |
| 3,670,519 | 6/1972 | Newton | 62/191 X |
| 3,701,264 | 10/1972 | Newton | 62/191 |
| 3,922,877 | 12/1975 | Ophir et al. | 62/238 C |
| 4,023,948 | 5/1977 | Pitts et al. | 62/191 |

*Primary Examiner*—William E. Tapolcai

[57] ABSTRACT

An improved engine cooling system is combined with a jet-driven heat pump system for utilizing otherwise wasted heat from an engine to produce refrigeration and heating of cabin, charge air and other media without requiring additional shaft power from the engine. In a closed cycle, vaporized refrigerant fluid is conveyed via jet ejectors from the engine cooling jacket at a high pressure and temperature and from refrigerant evaporators at low pressures and temperatures to a radiator/condenser at an intermediate pressure and temperature. The greater portion of condensed refrigerant fluid is pumped back to the engine (boiler) and the balance is throttled into the evaporators (heat exchangers) to produce an evaporative cooling effect. The vapor resulting therefrom is evacuated by the ejectors and returned to the condenser/radiator. In the cooling mode, the engine jacket constitutes the boiler in a Rankine cycle power circuit providing motive fluid power for the jet vapor compressor in a reverse Rankine cycle refrigeration circuit incorporating the heat exchangers as cooling coils. In a heating mode the high pressure vapor is conveyed directly from the engine to the heat exchangers which then serve as condensers to provide condensation heating effects, the partially condensed refrigerant being further condensed in the radiator.

17 Claims, 12 Drawing Figures

COMBINED ENGINE COOLING SYSTEM AND WASTE-HEAT DRIVEN HEAT PUMP

RELATED APPLICATIONS

This application is a continuation-in-part application of Ser. No. 631,023 filed Nov. 12, 1975 for Combined Engine Cooling System and Waste-Heat Driven Automotive Air Conditioning System, now U.S. Pat. No. 4,164,850.

TECHNICAL FIELD OF THE INVENTION

The field of art to which the invention pertains is automotive including engines, air conditioning, intercooling, turbocharging, aftercooling, fuel cooling and charge cooling.

BACKGROUND OF THE INVENTION

Waste heat from automotive (heat) engines is an essential consequence of the thermodynamics of converting the chemical energy of the fuel into mechanical work. In fact, in a practical engine, the greater portion of the fuel heating value must be removed from the engine proper as a result of which the essential engine exhaust and cooling requirements arise. While this heat is practically unavailable directly for producing further work within the engine itself, it can be made available indirectly by various means for relatively high level uses both within the engine, as by compounding of turbocharging, and external to the engine, as by heating, refrigeration (air conditioning) or other auxiliary power applications. In the first use, the waste heat provides the power to alter engine input conditions or to add recovered power to the output, resulting in increased power and/or fuel economy. The latter case represents a saving in engine power by substituting a waste-heat-powered byproduct function for one which would otherwise take some additional prime engine shaft power and fuel to produce it.

The present invention not only combines improved engine cooling with a system for waste-heat-driven heat pumping but it also permits the two types of waste heat performance augmentation to be combined. In particular, high-rate, isothermal jacket cooling is obtained by nucleate boiling heat transfer to generate a motive fluid for a jet-type thermo-compressor operating in true Rankine power cycle fashion. The power produced therefrom constitutes the actuation of a reverse Rankine cycle (vapor compression) heat pump which can be used to heat or cool various media. A particularly important application is the cooling and heating of the engine intake charge. Another is the cooling and heating of vehicle passenger or cargo environments. Some examples will illustrate the utility of the invention.

Private automobiles represent one of the largest single classes of energy consumers in the United States. A significant portion of fuel consumption of automobiles is due to the growing use of air conditioners. Additionally, air conditioning equipment constitutes a significant fraction of the initial cost of the private automobile. Such equipment typically is provided with a reciprocating piston compressor which is mechanically coupled to the engine and is generally complete in itself as an add-on component. The additional vehicle weight and engine power involved requires more fuel consumption and increases fuel consumption by as much as 15%.

On the other hand, waste heat from automotive engines is available virtually free of cost and is responsive to relatively high energy level uses. Within minutes, even at idle, tail pipe temperatures exceed 500° F. Fully 40% of the heating value of total fuel consumption of a spark ignition engine exits at the tail pipe. Another 35 to 40% leaves by the cooling system. At cruising conditions, exhaust gas temperatures exceeding 1200° F. are produced. Engine material temperatures must be maintained at between 150° and 350° F. by the cooling system to ensure engine integrity.

Accordingly, it would be desirable to provide some means of high rate utilization of the engine waste heat to take economic advantage thereof. The present invention provides a means for effectively and economically controlling engine temperatures while utilizing the otherwise wasted heat generated by an automotive engine to produce refrigeration and heating for passenger comfort control without requiring additional shaft power from the engine. Application of the present invention to passenger automobiles can obtain mileage improvements of as much as 2 to 4 mpg when air conditioning is in use.

Turbocharging internal combustion engines produces spectacular gains in specific power. However, the results of charge compression can be greatly offset by the attendant charge temperature rise from compression. High charge temperatures not only diminish the power recovery of turbocharging but also itensify engine cooling requirements inasmuch as the higher engine inlet temperature will cause a greater portion of the recovered exhaust energy to flow as heat into the engine parts rather than contribute to shaft power. A further consequence is an increase in engine octane requirement if a spark ignition type engine is involved.

Charge cooling, i.e. intercooling, aftercooling or evaporative cooling, is usually employed in high performance turbocharging applications. Evaporative cooling, e.g. the use of excess fuel or water injection as in racing and aircraft applications, can result in excessive fuel consumption and/or power loss. Intercooling, sometimes called aftercooling, may require extensive heat transfer surface and volume in the intake system. This usually involves bulky and expensive heat exchangers and the volume of intake charge hold-up may be increased to the point where engine throttle response is adversely affected. A lower temperature medium and a heat rejection system are also required. If ambient air is the lower temperature medium to which the heat is to be rejected, then significant increases in vehicle drag, frontal area and/or power may be required to achieve the required heat flow for a significant degree of charge cooling.

Without intercooling, the torque gain from charge compression has diminishing returns such that at 60 in. Hg. boost, only about half the potential is realizable. The greater the pressure boost, the more effective is the intercooling.

In a marine engine application these difficulties are easily avoided because of the ready availablity of ambient water for heat rejection. Such a medium has the desired properties of low temperature (usually lower than ambient air), high heat capacity, high heat transport rate and facile pumping characteristics.

However, in other transport applications where only an ambient air heat sink is available, substantial difficulties arise in accomplishing a significant amount of charge cooling by the customary method. Engine jacket cooling water has been used as an intermediate heat transfer medium in intercoolers but the effectiveness is limited due to the engine cooling load which must be shared in the heat rejection system (radiator) and also because of the sensible temperature changes which accompany heat transfer. A separate sensible coolant loop whether of the "direct" or "indirect" type is similarly limited. Heat pumping by vapor compression refrigeration overcomes the limitations of both the ambient heat sink and the sensible temperature gradients. However, a significant amount of power is required to drive the heat pump which, if derived from the engine shaft, would greatly offset any thermal advantage.

DESCRIPTION OF THE PRIOR ART

A review of the prior art reveals several attempts at both engine cooling and waste heat utilization. Perrine, U.S. Pat. No. 2,327,451, discloses a system for recovering some of the engine cooling jacket waste heat from the conventional cooling water leaving the engine, by interposing a heat exchanger/boiler for refrigerant motive fluid in a jet ejector which drives a vapor compression cycle for air conditioning. Because of the intermediate heat transfer used, involving a separate refrigerant working fluid, boiler and condenser, Perrine's system can utilize only a fraction of the jacket heat available and then only at reduced availability (temperature level). Ophir et al, U.S. Pat. No. 3,922,877, disclose a system similar to Perrine wherein engine exhaust gas instead of jacket water is contacted in a separate refrigerant boiler/heat exchanger. Since both Perrine and Ophir et al use separate refrigerant condensers placed in the same air stream as the engine radiator, both impair engine cooling. Newcombe, U.S. Pat. No. 2,353,966 shows a system for cooling engine cylinder, oil, intake, charge or other medium directly with evaporating refrigerant wherein a combination of engine exhaust and separate combustion gases are used to motivate an ejector vapor compressor. Newcombe's system places the engine cooling jacket at the lowest temperature level in the system and employs vapor compression heat pumping for the purpose of raising the temperature level of heat rejection to ambient to reduce the size and frontal area in air craft cooling applications. Extra fuel must be burned to produce the motive fluid to drive the system. In Newcombe, U.S. Pat. No. 2,360,969, a similar system is disclosed, wherein the ejector is used to augment the pressure and temperature of the vapor produced in the engine jacket to drive a vapor turbine coupled to a supercharger. In this case the heat recovered is used for charge compression instead of heat pumping. Allison, U.S. Pat. No. 2,404,778, uses the engine jacket not as a boiler or evaporator but as a preheater with the exhaust gas providing the heat for evaporation to vaporize the refrigerant motive fluid in an ejector. Like Ophir et al, the Allison system requires out-sized heat transfer surfaces for the exhaust heated boiler and subjects the refrigerant material to decomposition temperatures.

SUMMARY OF THE INVENTION

In the present invention, the motive power for heat pumping is derived from engine jacket heat recovery.

Specifically, in a cooling mode, vaporized refrigerant fluid is conveyed via a jet ejector through a condenser/radiator while a portion of the fluid is diverted from the condenser to a heat exchanger which serves as a refrigerant evaporator. The diverted portion is evaporated in the heat exchanger to produce a refrigeration effect and is then returned to the condenser by aspiration via the jet ejector. A high degree of efficiency can be accomplished (when required) by heat exchange through crossing vapor and liquid lines (recuperation) and by the use of the thermostatic controls, as will be described. A high pressure vapor driven rotary expander (e.g. turbine or piston engine) shaft connected to a rotary compressor is the rotary equivalent of the static jet ejector referred to above and shown hereinafter as the preferred embodiment.

In a heating mode, the high pressure, high temperature vapor is conveyed in a reverse direction directly from the engine to the heat exchanger and then to the condenser. In this mode, the heat exchanger (conditioner) serves as a condenser to provide a heating effect.

Cooling or heating is selected by appropriate valving. When both modes are closed out of the circuit, the pump can circulate the refrigerant in a closed loop between the engine and condenser/radiator via a pressure relief by-pass valve or other means, e.g. the variable area control ejector shown in FIG. 11, limit the maximum refrigerant pressure, and thus engine jacket temperature, to the saturation value corresponding to the pressure relief setting. Additionally, by the use of a normally open thermostatically controlled valve, coolant by-pass of the engine can accelerate warm-up on starting. When neither heating nor coolant modes dissipates sufficient heat to maintain proper engine jacket temperatures, the excess refrigerant vapor may be automatically by-passed around the ejector and/or heat exchanger directly to the condenser/radiator which has sufficient capacity to reject all engine jacket waste heat to ambient. The engine jacket temperature may also be maintained by use of the variable area nozzle ejector shown in FIG. 11. Also, a thermostatic expansion valve is used to by-pass small amounts of liquid to limit the maximum superheat leaving the engine/exhaust jacket in applications where the refrigerant has a substantial exposure to exhaust gases.

By means of the present invention, a charge cooling effectiveness exceeding 80% can be attained without utilizing additional shaft power, vehicle frontal area, excess fuel or an extra disposable evaporant. At 60 in. Hg. boost, the compressor discharge temperature would be typically about 360° F. and without any charge cooling, a little over 100% increase in engine torque can be obtained provided detonation can be avoided and engine cooling can be maintained. If 80% of the heat of compression is removed by intercooling (80% effectiveness), the torque gain from turbocharging could be almost doubled without suffering impractical increases in octane and cooling requirements.

Another feature of the invention is that in addition to charge cooling, a multiplicity of other refrigeration and heating functions can be provided simultaneously by the addition of parallel vapor and liquid circuits.

The present invention obtains a basic thermal advantage over conventional direct and indirect intercooling methods using an ambient air heat sink. The thermal advantage of the heat pumping method disclosed is due to three basic novel features:
1. The latent heat transport mechanism minimizes flow rates, heat transfer surface and volume, and overall temperature differences required between the coolant and the intake charge.
2. The heat pumping effect obtains a low coolant temperature in the intercooler and a high coolant temperature in the radiator.

3. Heat transfer in the engine jacket occurs at nearly optimum conditions for nucleate boiling which gives the highest possible heat transmission at the least overall temperature variation providing significant benefits to engine integrity in high performance, high output applications.

In particular, the present invention combines an improved automotive engine cooling system with a Rankine cycle heat pump system which utilizes waste heat from the engine to vaporize refrigerant fluid which travels through a condenser and is pumped back to the engine. While the present system uses a smaller than conventional coolant pump which may be either driven by the fan belt or electrically driven, there are no additional high-speed rotary or reciprocating compressor parts such as bearings, belts, dynamic seals, lubricants, clutches, or other mechanical features as presently required for air conditioning. Accordingly, wear and leakage are eliminated as factors limiting the service life of the equipment. Furthermore, as the engine coolant is caused to undergo a liquid-to-vapor phase change in the cooling jackets, high heat transfer rates to the refrigerant fluid will result in greater uniformity of temperature of engine parts, thereby reducing thermal distortions, corrosion, hot spots, scaling, lubricant break-down and, consequently, engine wear. The high-rate heat transfer characteristic should be particularly valuable in high performance and rotary (Wankel) engines, especially when aluminum construction is used. Further the accelerated warm-up characteristic is valuble in reducing the exhaust emissions of passenger automobiles. Finally, the waste heat drive feature eliminates the shaft power penalty of refrigeration for air conditioning or charge cooling and thereby improves vehicle fuel economy.

Broadly, my invention is a compound engine including internal combustion within the cylinder-combustion chambers, and external combustion represented by the cooling jacket space functioning as a boiler to provide motive vapor for a Rankine cycle power system to drive a reverse Rankine cycle heat pump. This system is unique in that the engine coolant, the power cycle working fluid and the heat pump working fluid are the same fluid.

BRIEF DESCRIPTION OF DRAWINGS

FIG. 10 also shows the regime of conventional water jacket heat transfer performance.

DESCRIPTION OF PREFERRED EMBODIMENTS

Figures 1, 11:
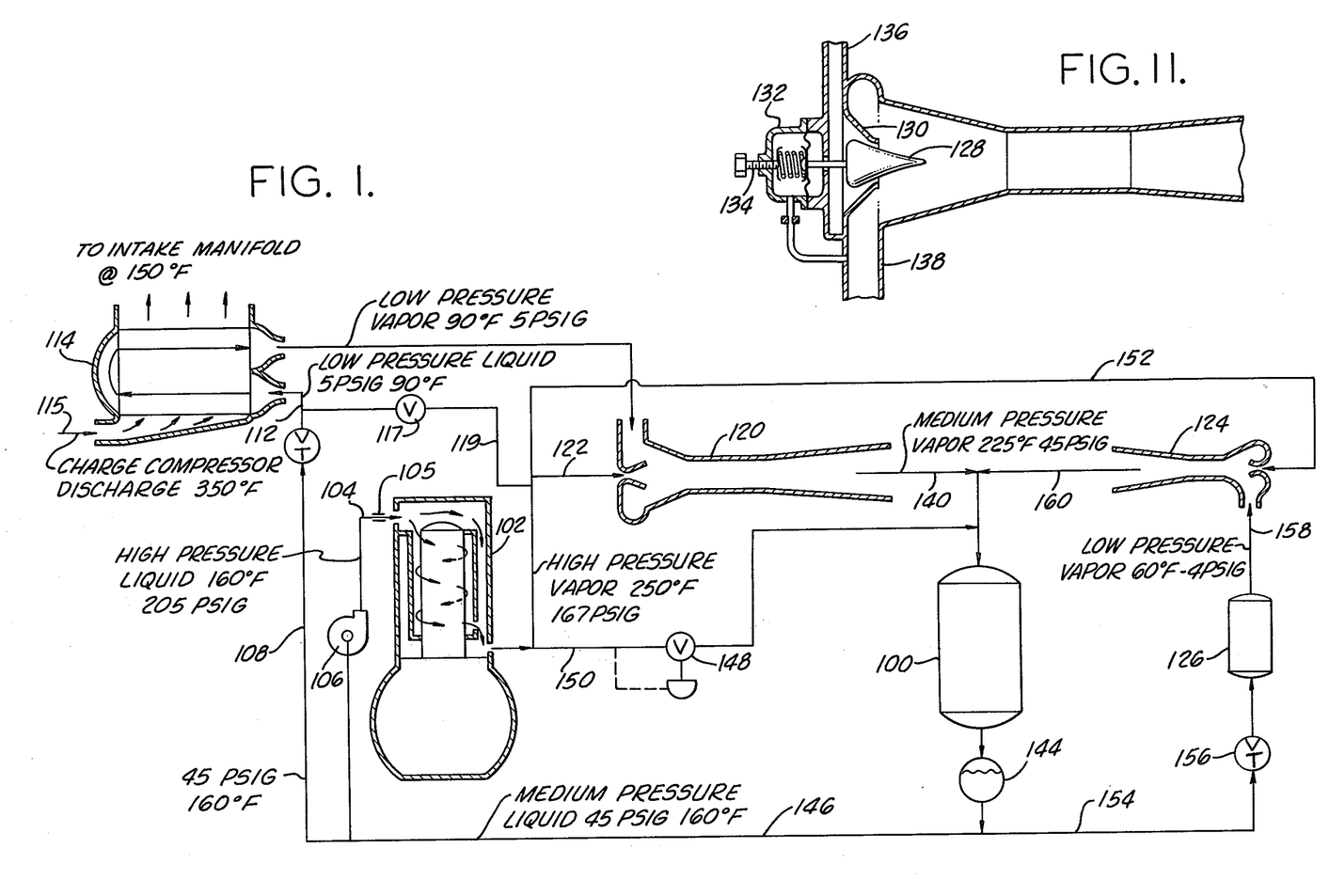
FIG. 1 is a schematic diagram, partially in section, of a charge cooling system for a high performance engine application constructed in accordance with the present invention showing typical flows, temperatures and pressures occurring at various points in the system.
FIG. 11 shows a modified jet ejector will variable area nozzle, which may be used in one embodiment of my invention.

Referring now more specifically to the drawings, FIG. 1 shows a simplified schematic diagram of my present system as applied to a turbocharged vehicle and FIGS. 2-6 show a system combining engine cooling with cabin air conditioning, as will be described in detail hereinafter. The geneal concept of my invention is shown in FIG. 1 with typical temperatures, pressures and flows indicated for Refrigerant 11, a typical commercial refrigerant. FIG. 1 shows how the present system is used to recover engine waste heat to power the jet driven heat pump for cooling the compression-heated charge as well as for auxiliary cooling functions such as fuel, cabin air, etc. In order to efficiently use the heat pumping capacity available at various temperatures, it is found preferable to use a multiplicity of jet pumps, each designed to provide the required lift for each evaporator, intercooler, auxiliary cooler, etc.

In the system shown in FIG. 1, a major pat of a moderately pressurized refrigerant liquid from the radiator (condenser) 100 is pumped into an engine cooling jacket manifold 102 through line 104 incorporating an orifice with pump 106. The pump effluent passes through a fuel orifice 105 which allows the pump to operate at a sufficiently higher pressure than the pressure in the jacket to permit pump 106 to operate free of pressure fluctuation caused by refrigerant boiling in the cooling jacket. The cooling jacket 102 functions as a boiler for producing a high pressure refrigerant vapor and may be of conventional design or configured to produce super heated vapor. A minor part of the medium pressure refrigerant liquid from the condenser 100, flows through line 108 and is expanded in throttle valve 110 to a low pressure region via line 112 in the heat exchanger (evaporator) 114. In this low pressure region, the refrigerant liquid is evaporated in heat exchanger 114 to create a cooling effect by which the charge compressor discharge fed through line 116 in heat exchange relationship with the low pressure refrigerant liquid through heat exchanger 114, is cooled.

The low pressure refrigerant vapor effluent from the evaporator 114 is aspirated from the evaporator through line 118 by a jet ejector 120 which is driven by the super heated high pressure vapor discharged from the engine cooling jacket 102 through line 122. A portion of the superheated cooling jacket effluent may be used to drive an auxiliary jet pump 124 which may be utilized in connection with an auxiliary cooler, for example, an air conditioner, fuel cooler, etc., shown in FIG. 1 as cooler 126. The jet pump 120 may be of conventional design through a variable area jet ejector as shown in FIG. 11 is preferred to convert the maximum available driving energy into kinetic energy for entrainment and exchange with the secondary fluid over the widest range of operating conditions.

A variable area primary nozzle ejector shown in FIG. 11 contains a cone-shape plug or spike nozzle body 128 which is positioned within the nozzle throat 130 and is axially moveable and positioned with a servo actuator 132. Operation of the jet pump can thus be automatically controlled by a simple direct-acting, upstream-pressure and/or temperature position servo 132 operating on the nozzle body 128 to match throat area to available flow. Control of the nozzle plug 128 position is obtained by balancing forces due to downstream pressure distribution, spring compression, diaphragm resistance and upstream static pressure. The equilibrium position of the nozzle plug 128 is adjustable by a spring pre-load adjustment screw 134. The primary fluid inlet 136 and the secondary fluid inlet 138 are modified in the variable nozzle jet pump shown in FIG. 11 but serve essentially the same purpose as the conventional pump 120 shown in FIG. 1. Although one form of differential pressure control is illustrated in FIG. 11, it is obvious that various other system parameters could be used to accomplish nozzle control.

Figure 12:
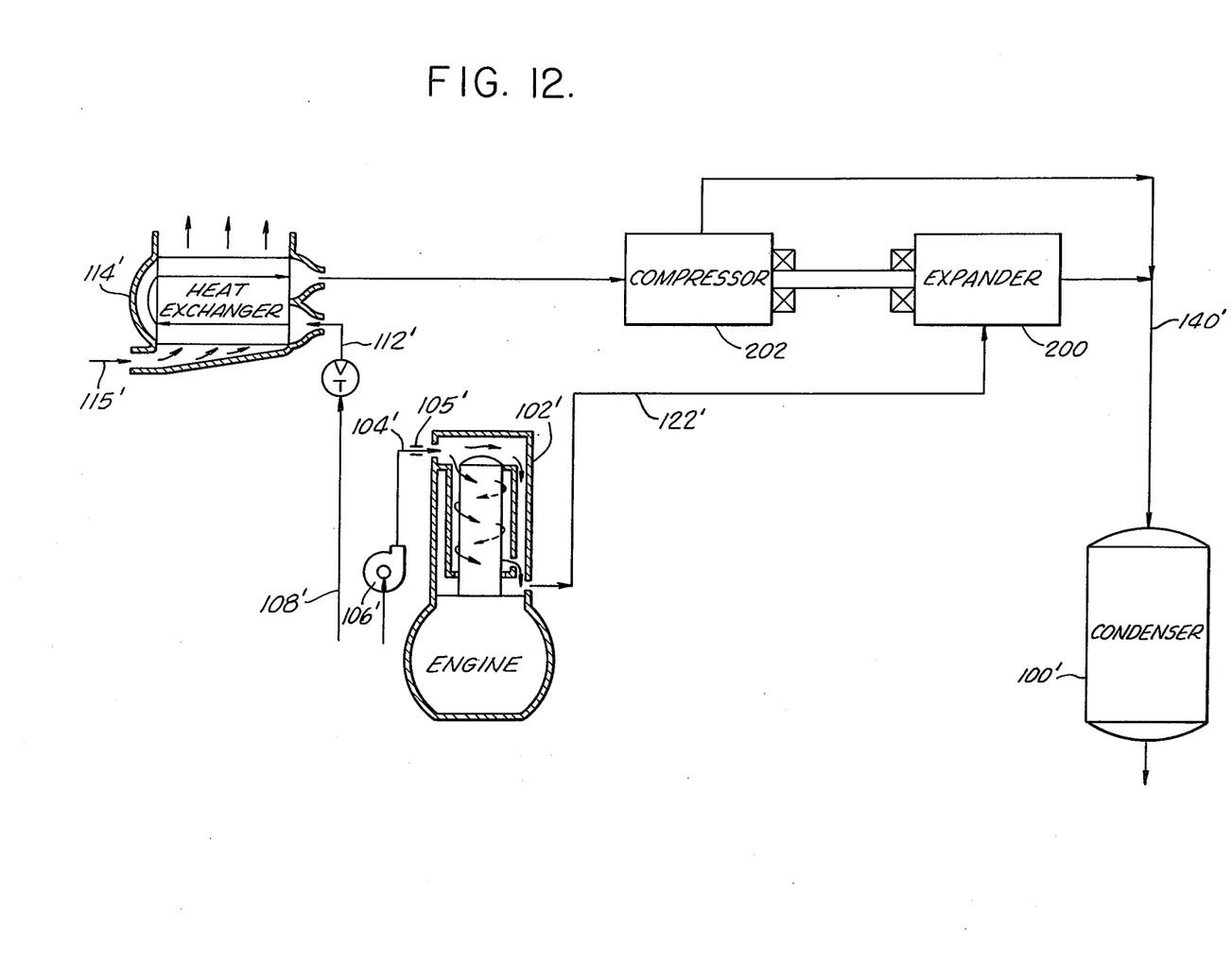
FIG. 12 shows a rotary expander (motor) shaft-coupled to a rotary compressor connected to the system of FIG. 1 to illustrate the rotary equivalent of the static jet ejector.

The high pressure vapor discharged from the engine cooling jacket 102' through line 122' may also be used to drive a rotary expander such as a turbine 200 (or other pneumatic motor device) which would be shaft connected to and driving a rotary compressor 202 of either the centrifugal or positive displacement type for the purpose of evacuating the low pressure vapor from the heat exchanger 114 with both the exhaust streams of expander 200 and compressor 202 manifolded together and exhausting into the condenser through line 140' as shown in FIG. 12. This shows how the preferred embodiment (ejector) can be represented by a more conventional Rankine cycle rotary equivalent.

The admixture of the hot, high pressure vapor from the cooling jacket (boiler) 102 and the cooler low pressure vapor from the heat exchanger (evaporator) 114 in the jet pump results in a hot medium pressure vapor effluent in line 140 which is cooled and condensed in radiator 100, which is basically an air cooled condenser. From the condenser 100, the condensed liquid is stored in receiver 144 and from there recirculated through the engine cooling jacket 102 and evaporator 114 through line 146. The heat exchanger 114 may be used to heat the fluid 115 passing in heat exchange relationship with the refrigerant, by opening heating valve 117 in line 119 to pass hot refrigerant vapors into and through heat exchanger 114 in which case heat exchanger 114 would serve as a condenser. Such heating may for example be useful for preheating an engine charge mixture in extreme ambient or cold start conditions. A pressure relief by-pass valve 148 may be positioned in line 150 to permit direct circulation of the refrigerant in a closed loop between the engine cooling jacket 102 and radiator 100 to limit maximum engine jacket pressure and consequently temperature.

Although my present invention is described herein in respect to charge cooling (FIG. 1) and hereinafter in detail in respect to air conditioning, both cooling functions may be combined in a single system by provision of an auxiliary jet pump 124 and line 152 for providing hot, high pressure motive vapor from the engine cooling jacket 102. Medium pressure liquid from the condenser (radiator) may be throttled through line 154 to auxiliary cooler 126 with throttle valve 156 for evaporation and consequent cooling therein. The cool low pressure vapor generated in the auxiliary cooler (evaporator) is educted therefrom through line 158 by jet eductor 124 and the admixed vapors recycled to the radiator 100 through line 160. Typical fluid pressures and temperatures are shown in FIG. 1 to further demonstrate the effectiveness of the present system as used for engine charge cooling. The temperatures and pressures shown on the drawing do not account for line temperature and pressure losses.

Figure 2:
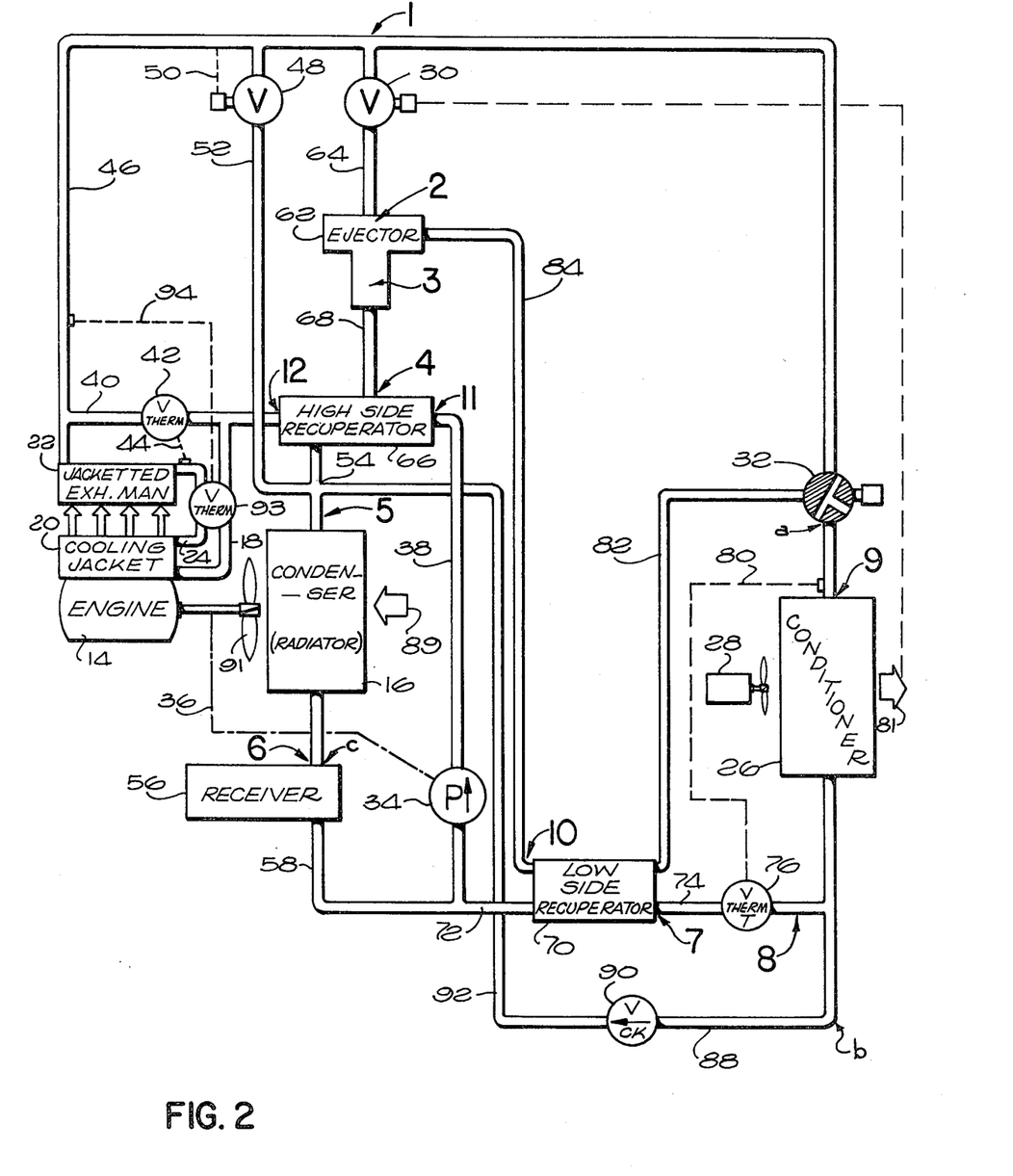
FIG. 2 is a schematic illustration of an air conditioning system constructed in accordance with the present invention.

Referring to FIG. 2, the present system incorporates the engine cooling system of an automobile, whereby the engine 14 and condenser/radiator 16 of an automobile respectively vaporize and condense refrigerant fluid carried in a closed circuit. The head and block cooling jacket 20 of the engine 14 consists of cores (cavities) forming conduits therethrough in the conventional manner and tubing 18 is connected to the cooling jacket inlet to supply refrigerant fluid thereto. The engine's exhaust manifold 22 may be jacketed, as is commonly done with marine engines. When the exhaust manifold jacket is also cored to provide conduits for conveyance of refrigerant fluid which is supplied from the head and block cooling jacket 20 by tubing 24, exhaust heat is recovered only to a small extent but this is valuable in obtaining additional vapor super heat which can enhance ejector performance.

The system shown in FIG. 2 includes a circulation mode wherein engine waste heat is dumped to ambient via the condensor 16. In the circulation mode, the system is neither cooling nor heating the cabin, in which case waste heat is insufficient to remove engine waste heat at the rate required for proper engine temperature control and must be removed by other means as shown in FIG. 2.

Figure 3:
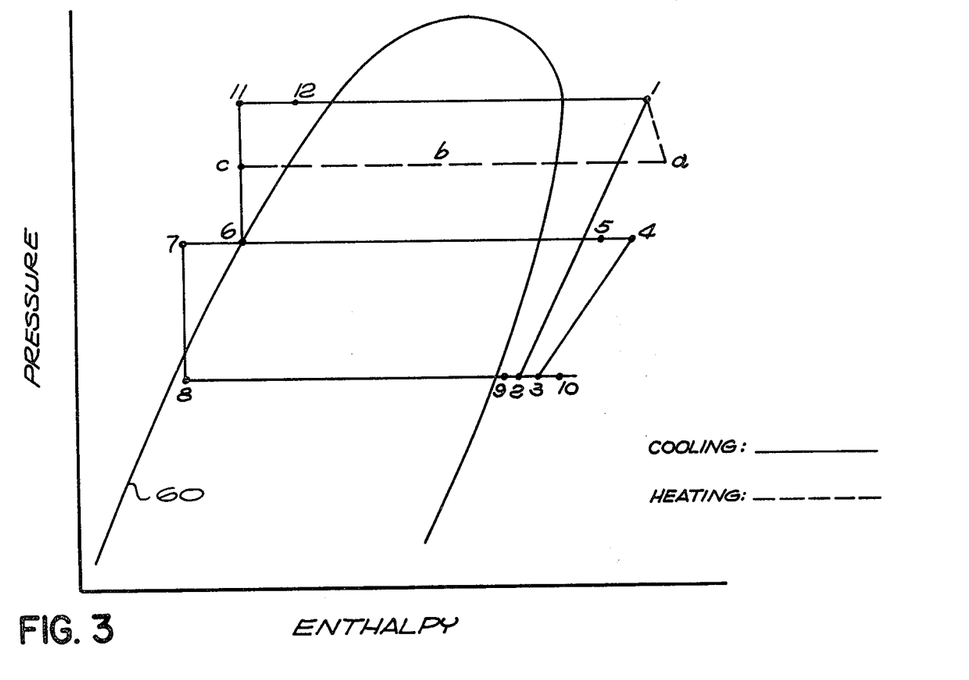
FIG. 3 is a thermodynamic diagram of the processes taking place when utilizing the present system, the cooling mode being represented by a solid line and the heating mode by a dashed line.
Figure 4:
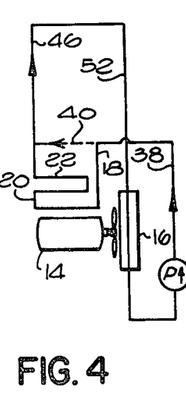
FIG. 4 is a diagrammatic representation of the flow of refrigerant fluid when both cooling and heating modes are closed out of the circuit and only engine cooling is required.
Figure 5:
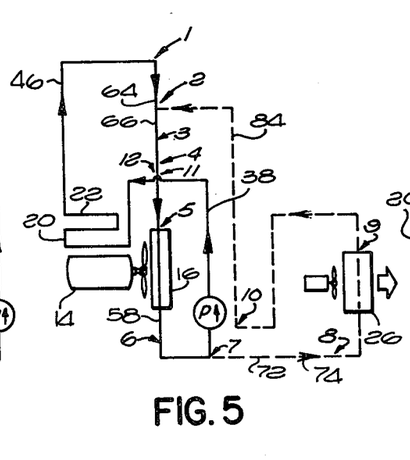
FIG. 5 is a diagrammatic representation of the flow of refrigerant fluid during an air conditioning cooling mode.
Figure 6:
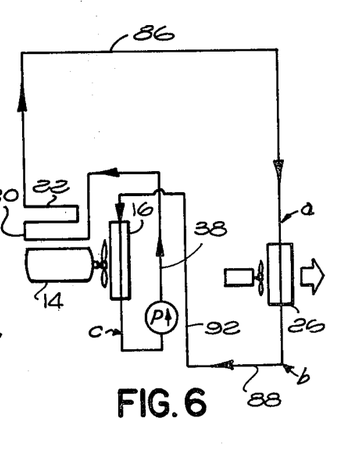
FIG. 6 is a diagrammatic representation of the flow of refrigerant fluid during an air conditioning heating mode.

Flows of refrigerant fluid in the circulation, cooling and heating modes are shown schematically in FIGS. 4, 5 and 6, respectively, and the schematic figures will be referred to in conjunction with FIG. 2 in describing each mode of the system's operation. Additionally, the thermodynamic diagram of FIG. 3 will be referred to in describing the cooling and heating modes.

Referring to FIGS. 2 and 4, in a circulation mode of operation, solenoid valves 30 and 32 are closed so that only the left side of the system, as depicted in FIG. 2, is operative. Initially, with a cool engine, refrigerant fluid driven by a pump 34 is pumped through tubing 38 (via a recuperator functional in the cooling mode to be described) and bypass tubing 40 through a normally open thermostatic valve 42. Bypass through the thermostatic valve 42 limits engine cooling so as to accelerate engine warm-up. The thermostatic valve 42 senses the engine temperature, as indicated by the dashed line 44, and closes after engine warm-up so that the refrigerant fluid then passes through the engine cooling jacket 20 and jacketed exhaust manifold 22 via the tubing 18 and 24 thereto.

The refrigerant fluid is vaporized by the engine cooling jacket 20 and jacketed exhaust manifold 22 and, as vapor, travels through tubing 46 to a pressure by-pass valve 48. The pressure by-pass valve 48 is responsive, as indicated at 50, to pressure in the tubing 46 to open and permit refrigerant vapor to be conducted through tubing 52 to and through the condenser 16 via a four-way tubing intersection 54. As a result of closure of the valves 30 and 32, the only pathway through the intersection 54 is to and through the condenser 16. As the refrigerant fluid passes through the condenser 16, it is condensed and accumulated at a receiver 56 and then travels from there through tubing 58 to the pump 34 to repeat the cycle, while heat from engine cooling is rejected to ambient air 89, drawn through the condenser/radiator 16 by the engine driven fan 91. The refrigerant fluid vapor may be superheated in the exhaust manifold jacket 22, as indicated at point 1 in FIG. 3. Control of the degree of superheat can be obtained by a modulating thermostatic expansion valve 93 responsive to the vapor temperature, as indicated at 94, by a liquid charged capillary sensor to admit refrigerant liquid directly into the exhaust manifold jacket as required to maintain a preset increment of superheat regardless of the proportions of heat input received in the engine jacket and the exhaust manifold jacket, respectively.

A conditioner 26 is provided, including an electrically driven (by means not shown) fan 28 which blows air to be comfort conditioned across coils (not shown) constituting the conditioner 26. The conditioner 26 serves as an evaporator during a cooling mode of operation and as a condenser during a heating mode, as will be described in more detail hereinafter. By appropriate operation of solenoid valves 30 and 32, as hereinafter described, vaporized refrigerant fluid, e.g., trichlorofluoromethane (Refrigerant 11), is conveyed either from the condenser 16 to the conditioner 26, in a cooling mode, or from the engine 20 to the conditioner 26, in a heating mode. The pump 34 is either mechanically driven by the engine 20, as schematically indicated at 36, or is electrically driven by means not shown, and delivers condensed refrigerant fluid from the condenser/radiator 16 to the engine 20.

The cooling mode of operation can best be described by referring to FIGS. 2 and 5 together with FIG. 3. In FIG. 3, the pressure and enthalpy at various point locations of the apparatus are plotted with respect to the vapor/liquid equilibrium line 60 for the refrigerant fluid. Points to the left of the line, e.g., points 6, 7, 11 and 12 (and point c for the heating mode) represent locations in apparatus at which the refrigerant fluid is in a liquid state. The regions within the curve, e.g., point 8 (point d for the heating mode), represent points in the apparatus at which the refrigerant fluid is a mixture of vapor and liquid. Points to the right of the curve, e.g., points 1-5, 9 and 10 (point a in the heating mode) represent points in the apparatus at which the refrigerant fluid is superheated vapor.

For operation in the cooling mode, the system includes an aspirator in the form of a jet ejector 62 connected to the valve 30 by tubing 64 and conveying refrigerant vapor to a heat exchanger or recuperator 66 through tubing 68. Jet ejectors are known; see for example the article entitled "Experimental Research on a Fluorinated Hydrocarbon Jet Refrigerant Plant" by Cavallini et al, appearing in "Progress in Refrigeration Science and Technology", Vol. 2, (1967), pages 1225–1238, incorporated herein by reference. The heat-exchanger 66 is referred to in the drawing as a high (pressure) side recuperator and permits recovery, from the high (pressure) side of the system, of the residual heat of compression by transfer to the engine coolant (refrigerant) feed liquid. The refrigerant vapor is then conveyed past the intersection 54 through the condenser 16, to the receiver, and, for the most part, back to the pump 34.

A minor portion of the refrigerant liquid from the condenser 16 is diverted through the conditioner 26 by means of tubing constituting a parallel circuit across the ejector 62 and condenser 16. The parallel circuit includes a low (pressure) side recuperator 70 through which a portion of the condensed refrigerant fluid is led via tubing 72 and then via tubing 74 through a thermostatic expansion or throttle valve 76 and tubing 78 to and through the conditioner 26. The thermostatic expansion valve 76 is controlled to increase delivery in accordance with refrigerant superheat temperature increases sensed at the refrigerant exit of the conditioner 26 as indicated at 80. The conditioner 26 functions as an evaporator to vaporize the refrigerant fluid, thereby cooling the conditioned air 81 circulated therethrough by means of the fan 28.

Tubing 82 and 84 connects the conditioner 26 via the low side recuperator 70 to the ejector 62 so that flow of the primary stream of refrigerant through the ejector 62 induces flow from the system's low pressure side to aspirate refrigerant vapor from the conditioner 26. The three-way solenoid valve 32 is in a disposition rotated 45° clockwise from that shown in FIG. 2 so as to direct the refrigerant vapor through the tubing 82. The refrigerant vapor is drawn through the low side recuperator 70, for heat exchange with and subcooling of the condensed refrigerant liquid from the receiver 56, and then through the tubing 84 into the ejector 62, to complete the circuit.

In fluid flow terms, and referring more closely to the points 1–12 on the thermodynamic diagram of FIG. 3, refrigerant vapor heated by the engine cooling jacket 20 and jacketed exhaust manifold 22 enters the ejector 62 primary nozzle via the solenoid valve 30 at 1 and is supersonically expanded to the system low pressure level at 2, inducing flow from the system low pressure side 9 to evacuate the evaporator or refrigerant via the low side recuperator 70 at 7. The two streams combine and mix in the ejector 62 at 3 and diffuse to the intermediate pressure level of the system at 4 through the high side recuperator 66. Some of the residual heat of compression from the high side is recovered by transfer to the engine feed liquid in the high side recuperator 66 at 11–12 prior to the refrigerant fluid entering the condenser 16 at 5 where the remaining superheat, latent heat and perhaps some additional sensible heat (subcooling) is extracted by ambient air to condense the refrigerant at 6 which is then held up in the receiver 56. The major portion of this subcooled refrigerant liquid is returned to the engine by the pump 34 at the system high pressure level 11–12 via the recuperator 66. The remainder passes through the low side recuperator 70 for further subcooling at 7 by heat exchange with the vapor leaving the conditioner 26 and is throttled to the conditioner 26 at the system low pressure level at 8 to make available its latent heat of evaporation at a low temperature to produce a refrigeration effect.

Referring now to FIG. 6, in conjunction with FIGS. 2 and 3, with respect to the heating mode of operation, the solenoid valve 30 is closed and the three-way center closed solenoid valve 32 is rotated 45° counterclockwise from the position shown in FIG. 2 so that the ejector 62 is closed out of the system. In this mode, refrigerant fluid, vaporized by the engine cooling jacket 20 and jacketed exhaust manifold 22, is conveyed through tubing 86 to and through the conditioner 26, now in a reversed direction. The conditioner 26 now serves as a condenser with the refrigerant producing a heating effect in giving up its latent heat of condensation to the air passing therethrough by force of the fan 28. The partially condensed refrigerant is then conducted through the tubing 78 but by-passes the expansion valve 76 via tubing 88 and a check valve 90. The refrigerant is ducted by tubing 92 to the tubing intersection 54 and from there is conveyed to and through the condenser 16. The refrigerant is returned to the high pressure side via the receiver 56 and pump 34 in the same manner as described above with respect to the other modes of operation.

In fluid flow terms, and referring more closely to the points a, b and c in the thermodynamic diagram of FIG. 3, superheated refrigerant vapor at point a, adjacent the three-way solenoid valve 32, is conducted through the conditioner 26 where it partially condenses, travels to point b, through the check valve 90, through the condenser to point c then via the pump 34 back to the engine.

It will be appreciated that one can simply switch from a cooling mode to a heating mode, or to neither cooling nor heating, by simple actuation of solenoids controlling the valves 30 and 32. Modulation of the cooling capacity can be effected by cycling valve 30 on demand from an air temperature thermostat (not shown). Modulation of heating capacity can be similarly effected by cycling valve 32 with valve 30 closed. When neither heating nor cooling of conditioned air is called for, both valves 30 and 32 are closed to all ports and the high side pressure (and temperature) is permitted to float upward to the pressure relief setting of the pressure by-pass valve 48. Enough refrigerant is circulated directly to the condenser/radiator 16 to dump all the engine 14 waste heat to ambient via the condenser/radiator 16 and the ambient air circulated therethrough by force of the fan 91. The refrigerant pump 34 operates continuously while the engine is operating and together with the pressure bypass valve 48 serves to limit the maximum engine jacket temperature to an acceptable level.

The adiabatic efficiency of the ejector 62 and the overall coefficient of performance (COP) of the system can be calculated utilizing hypothetical cycle conditions and refrigerant (DuPont Freon 11), as listed in Table 1.

TABLE 1

| FIG. 3 Location | Temp., °F. | Pressure, psia | Enthalpy, BTU/lb. |
|---|---|---|---|
| 1 | 280 | 160 | 126 |
| 2 | 63 | 7 | 100 |
| 3 | 68 | 7 | 101 |
| 4 | 199 | 33 | 118 |
| 5 | 152 | 33 | 111 |
| 6 | 120 | 33 | 33 |
| 7 | 101 | 33 | 29 |
| 8 | 40 | 7 | 29 |
| 9 | 50 | 7 | 98 |
| 10 | 80 | 7 | 102 |

TABLE 1-continued

| FIG. 3 Location | Temp., °F. | Pressure, psia | Enthalpy, BTU/lb. |
|---|---|---|---|
| 11 | 140 | 160 | 38 |
| 12 | 173 | 160 | 45 |

The gross thermal ratio of the ejector 62 is:

$$nej = \frac{\text{gross compression energy}}{\text{available motion energy}} \quad (1)$$

$$= \frac{(h_4 - h_{10})(G_1 + G_{10})}{(h_1 - h_2)G_1}$$

where subscripts (here and hereinafter) refer to locations in FIG. 2 and FIG. 3 and where h=enthalpy and G=mass flow.

From an energy balance in the ejector 62, $$G_{10}h_{10} - G_1 h_1 = (G_1 + G_{10})h_4 \quad (2)$$

Assuming a unit mass of low side vapor, $G_{10}=1$, from Eq. 2:

$$G_1 = \frac{h_4 - h_{10}}{h_1 - h_4}$$

Using properties listed in Table 1:

$$G_1 = \frac{118 - 102}{126 - 118} = 2;$$

then from Eq. (1)

$$nej = \frac{118 - 102}{126 - 100} \times \frac{3}{2} = 0.92$$

and the adiabatic efficiency of the ejector 62 is:

$$nad = \left( \frac{h_4 - h_{10}}{h_1 - h_2} \cdot \frac{G_v}{G_s} \right) - \frac{16}{26} \times \frac{1}{2} = 0.308.$$

The cooling effect under these conditions is $$Q\text{ref} = (h_9 - h_8)G_{10}$$

$$= 69 \times 1 = 69 \text{ BTU.}$$

The net heat input of the engine to the refrigeration system would be $$Q\text{in} = (h_1 - h_{12})G_1$$

$$= 81 \times 2 = 162 \text{ BTU.}$$

The overall coefficient of performance of the system would be $$COP = \frac{Q\text{ref}}{Q\text{in}} = \frac{69}{162} = 0.426.$$

Typical cooling capacity and a comparison with mechanical vapor compression refrigeration can be determined by assuming typical cruise characteristics of an automotive installation, as listed in Table 2.

TABLE 2

| Road horsepower (RHP) | 30 |
|---|---|

TABLE 2-continued

| | |
|---|---|
| Specific fuel consumption (SFC) lb/RHP-hr. | 0.5 |
| Speed, mph | 45 |
| Fuel consumption, mpg | 18 |
| Fuel heating value (HV) BTU/lb | 20,000 |
| Fuel density, lb/gal | 6 |
| Exhaust temperature, °F. | 1,000 |
| Cylinder overall temperature °F. | 250 |

Determining first the potential cooling capacity available from the foregoing automotive installation, the total heat input to the engine is $$Q_F = RHP \times SFC \times HV$$
$$= 30 \times 0.5 \times 20,000 = 300,000 \text{ BTU/hr.}$$

of which about half is passed out via the exhaust system.

Assuming no more than 25% of the engine waste heat is economically recovered by 173° to 280° F. refrigerant from 1000° F. exhaust gas and 250° F. cylinder walls, about 75,000 BTU/hr is added to the refrigerant in the boiler (engine cooling jackets). The net refrigeration capacity at the 40° F. evaporator (conditioner 20) is then $$Q_{ref} = COP \times Q_{in}$$
$$= 0.426 \times 75,000 = 31,950 \text{ BTU/hr}$$
$$= 2.66 \text{ tons.}$$

The net heating capacity at a 180° F. (80 psia) conditioner temperature would be 75,000 BTU/hr.

Conventional mechanical vapor compression refrigeration, which has a COP, measured from the shaft, of 3 would require a compressor shaft power input ($HP_c$) of approximately $$HP_c = \frac{Q_{ref}}{2545\ COP} = \frac{31,950}{2545 \times 3} = 4.185 \text{ hp.}$$

This additional load on the engine results in an increase in power requirements of $$\frac{4.185}{30 + 4.185} \times 100 = 12.2\%$$

and a comparable increase in fuel consumption.

Table 3 sets forth the typical physical characteristic of the system of FIG. 2.

TABLE 3

| | |
|---|---|
| Pump pressure rise, psi | 127 |
| Pump shaft efficiency | 0.5 |
| Pump shaft horsepower (SHP) | 0.178 |
| Pump flow rate, gpm | 1.2 |
| Compressor-induced flow rate, cfm | 45.2 |
| High side recuperator effectiveness | 0.6 |
| High side recuperator number of transfer units (Counterflow) | 1.5 |
| Low side recuperator effectiveness | 0.57 |
| Low side recuperator number of transfer units (Counterflow) | 1.3 |
| Condenser/radiator capacity BTU/hr. | |
| at 120° F. refrigerant | 150,000 |
| at 250° F. refrigerant | 3,000,000 |
| Evaporator/conditioner capacity BTU/hr. | |
| at 40° F. refrigerant | 32,000 |
| at 150° F. refrigerant | 85,000 |

The load of the pump on the engine results in a power requirement of $$\frac{0.178}{30 - 0.178} \times 100 = 0.59\%$$

which approximately offsets the existing pumping requirement for cooling only so that changes in parasitic shaft power are negligible.

Accordingly, it will be appreciated that an effective air cooling and heating system has been provided with a negligible shaft power requirement. Further, a sealed engine cooling system incorporating an evaporating fluid has been provided which virtually eliminates scaling, corrosion and freezing while reducing weight and bulk and increasing engine performance and life by improving temperature control and uniformity.

While a preferred embodiment has been shown with a particular halocarbon refrigerant fluid, it is obvious that a variety of other materials could be used. The refrigerant fluids useful with the present system are chemically stable, constant-boiling dielectric fluids, e.g. water, ammonia, inert organic materials, for example, the commercial halocarbons, alcohols, etc., and certain azeotropes of the foregoing.

Figure 7:
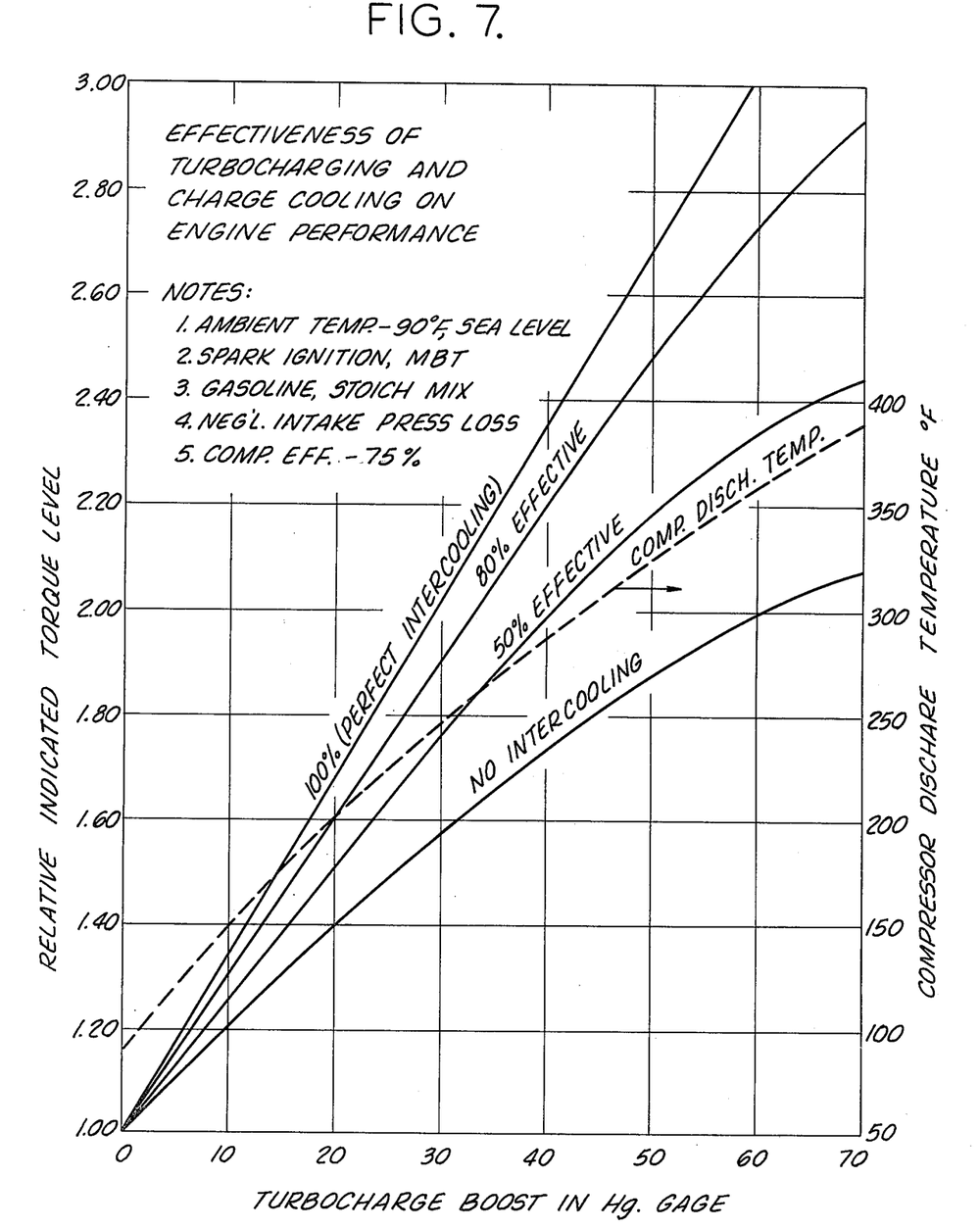
FIG. 7 is a graph of relative torque and temperature versus boost pressure showing the value of turbocharging and charge cooling to engine performance and indicating the importance of intercooler effectiveness which can be obtained with the present invention.
Figure 8:
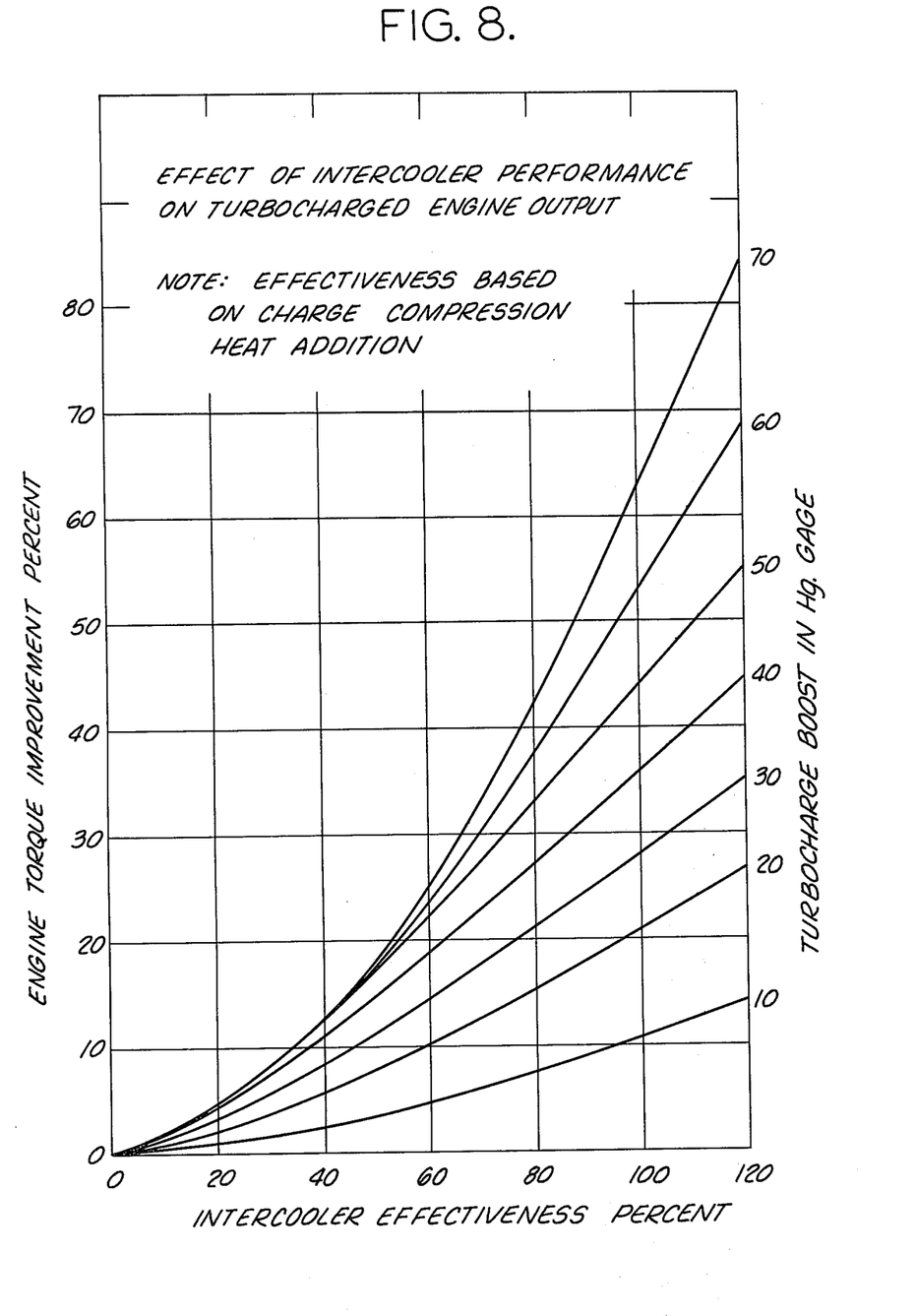
FIG. 8 is a graph of turbocharged engine torque improvement versus intercooler effectiveness at various levels of boost pressure showing more specifically the value of intercooler effectiveness.

Referring to FIG. 7, the effectiveness of turbocharging and intercooling in improving internal combustion engine performance is shown. Also shown is the typical turbocompressor discharge temperature characteristic which give rise to the striking benefits of intercooling. Removing all the heat of compression from the compressed charge (perfect intercooling) more than doubles the maximum torque available at 60 in. Hg. boost. As shown more particularly in FIG. 8, doubling intercooler effectiveness (from 50% to 100%) can increase the torque of an engine turbocharged to 60 in. Hg. gage almost three-fold.

Figure 9:
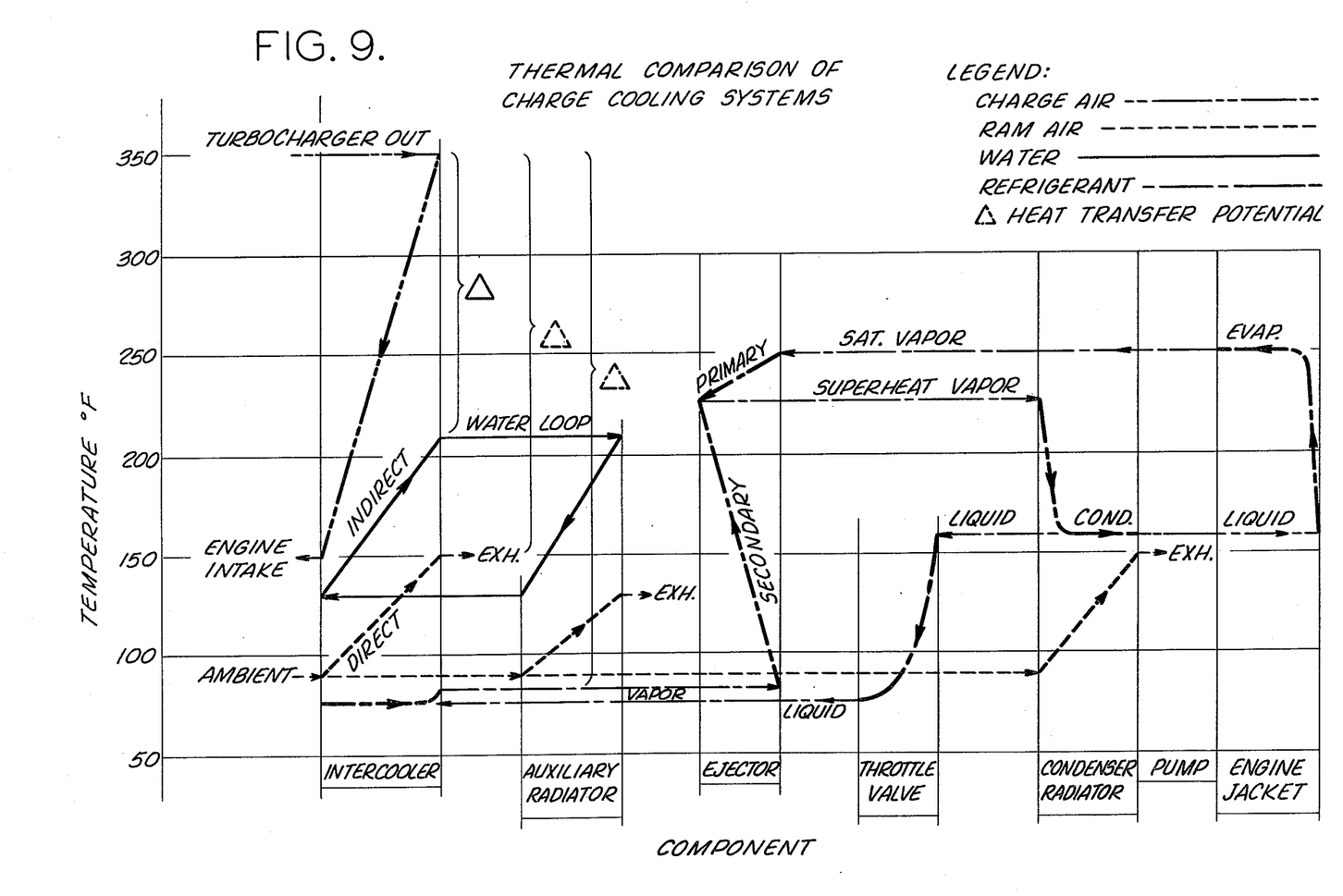
FIG. 9 is a thermal diagram comparing the temperature distributions in the components of the system constructed in accordance with the present invention and those prevailing in conventional intercooler systems.

If all other heat transfer factors are considered equal, the effectiveness will depend on the temperature of the heat absorbing medium used in the intercooler according to the equation $$E = \frac{T_{h1} - T_{h2}}{T_{h1} - T_{c1}}$$

where $T_{h1}$ and $T_{h2}$ are the charge air temperatures in and out of the intercooler and $T_{c1}$ is the cooling medium temperature at intercooler inlet. If $T_{c1}$ is the ambient or initial charge air temperature (before compression), the effectiveness relation expresses the degree of charge compression energy removed by the intercooler. Coolant inlet temperatures lower than the ambient air value could result in an intercooling effectiveness exceeding 100% of the charge compression energy removed. The heat pumping characteristic of the present system is capable of producing such below-ambient coolant temperatures which greatly increases its intercooling potential compared with ordinary ambient air heat sink methods (see FIG. 9).

FIG. 9 depicts the temperature distribution in the components of the present system applied to charge cooling as compared with that of two conventional methods using ambient air heat rejection. The value of the latent heat transport characteristic of the present system is clearly indicated as having a substantial thermal advantage in achieving high overall temperature differences in the intercooler which improve effectiveness and/or reduce size. The ability of the heat pumping effect of the present system to reduce coolant temperatures below ambient increases the thermal advantage still further. FIG. 9 shows some other characteristics of the present system such as the nearly isothermal temperature distribution of the coolant in the engine jacket and condenser-radiator. The isothermal characteristic is due to the latent heat capacity of the working fluid which is changing phase (evaporating in the engine jacket and condensing in the radiator). As a result, higher average temperature levels are obtained for heat rejection to ambient which are valuable for reducing radiator size to a minimum. The isothermal condition in the engine jacket is valuable for obtaining uniform temperatures in the engine parts which, in turn, reduces stresses and deformations and allows closer tolerances and greater structural margins to be used and at higher material temperatures.

Figure 10:
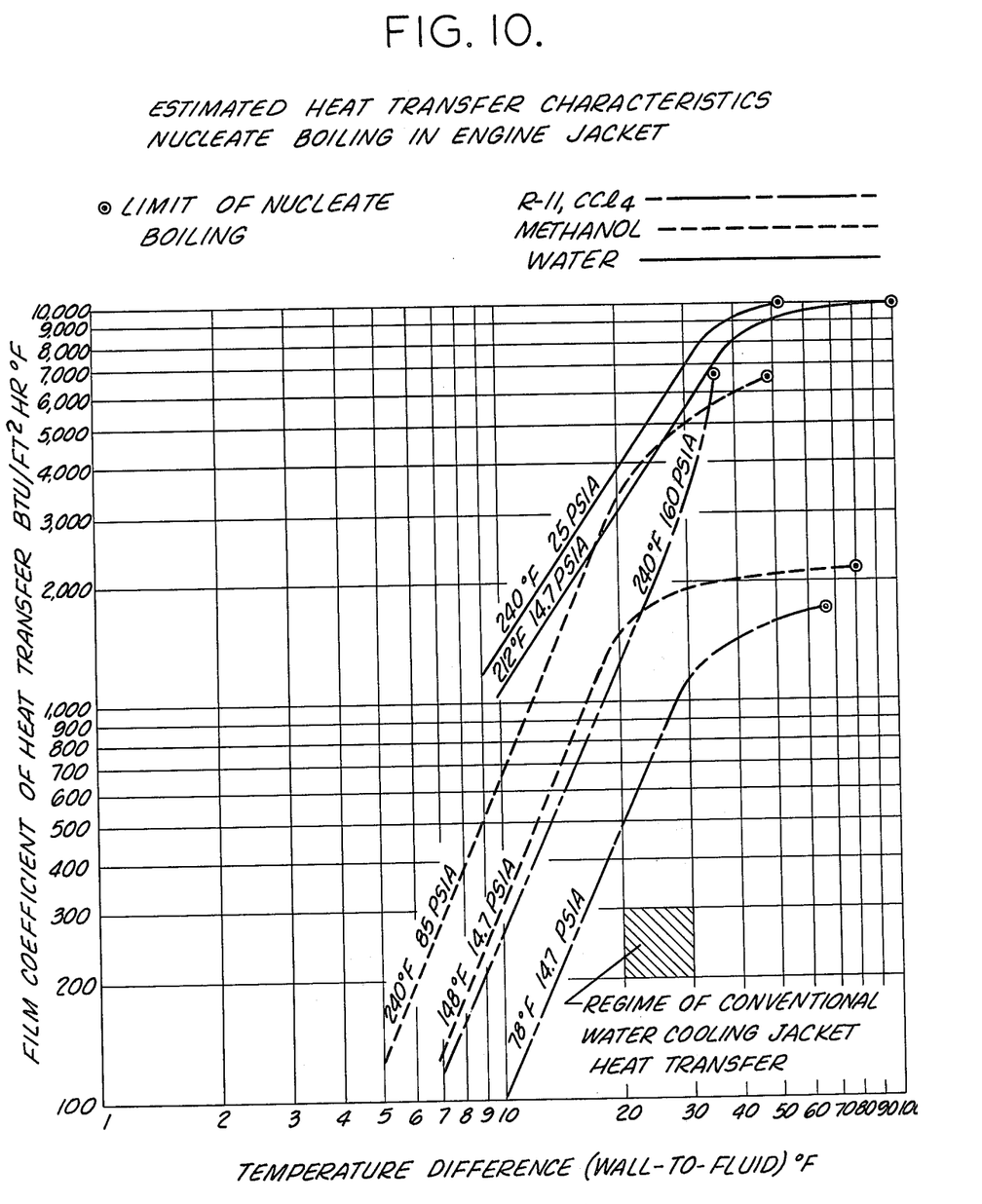
FIG. 10 is a graph of the film coefficient of heat transfer versus wall-to-fluid temperature difference for various fluids in nucleate boiling at various conditions showing peak heat flux and "burnout" temperature differences.

FIG. 10 shows some typical heat transfer characteristics obtaining in the engine jacket as a result of the nucleate boiling produced. By comparison, the regime of conventional convective water cooling is also shown. The value of nucleate boiling is clearly indicated, showing more than 10 times the heat transfer rate at comparable temperature differences. This characteristic leads to further improvement in engine temperature uniformity and structural integrity.

The use of boiling organic working fluids as engine coolants has been found to offer a number of advantages. First, they have somewhat lower critical pressures and at required engine coolant temperatures, the boiling pressures are an appreciable fraction of the critical pressure. This substantially reduces the ratio of vapor to liquid volume which reduces the volume fraction of vapor due to evaporation and allows a higher level of surface wetting to be maintained as the boiling progresses. Further, the organics possess low interfacial tension characteristics which produce low bubble contact angles which, when combined with the small vapor volume changes, makes for small bubble size and maintains the regime of nucleate boiling over a greater range of conditions. This means that high peak heat fluxes can be accommodated at lower temperature differences over the wides possible range of operating conditions.

While my invention has been described herein with a certain degree of particularity in reference to certain specific embodiments, my invention is not to be limited to the details set forth herein, but should be afforded the full scope and equivalents of the appended claims.

I claim as my invention:

1. An engine system which combines an internal combustion engine cooling system with a heat source for a Rankine cycle heat pump utilizing otherwise wasted heat to produce a thermal conditioning effect, comprising:
   a closed fluid circuit means;
   an internal combustion engine including a cooling jacket thereon; evaporative coolant fluid in said circuit means; condenser means for condensing vaporized coolant fluid; means for delivering a portion of the condensed coolant fluid from said condenser means to and through said engine cooling jacket at an increased pressure whereby to cool said engine and thereby heat and vaporize said coolant fluid;
   heat exchanger means, including means for passing the engine intake charge in heat exchange relation with a second portion of said condensed coolant fluid; means for utilizing said vaporized cooling jacket effluent as a motive fluid for conveying said coolant fluid effluent from said heat exchanger, into said condenser; and
   means for controlling the flow and pressure of said vaporized coolant from said cooling jacket to control the temperature of said engine cooling jacket and said engine intake charge.

2. The system of claim 1 including means for delivering condensed coolant fluid from said condenser means to and through said heat exchanger at a lower pressure to evaporate coolant in said heat exchanger.

3. The system of claim 1 including means for delivering vaporized coolant from said engine jacket to said heat exchanger whereby to condense said vaporized coolant in said heat exchanger.

4. The system of claim 1 wherein said conveying means is a jet ejector driven by the vaporized coolant fluid from said engine cooling jacket as the motive fluid.

5. The system of claim 4 wherein said means of controlling the flow and pressure of said vaporized coolant from said cooling jacket includes a variable area nozzle control for said jet ejector.

6. The system of claim 1 wherein said conveying means is a rotary compressor shaft driven by a rotary expander, the motive fluid for which is the vaporized coolant fluid effluent from said engine cooling jacket.

7. The system of claim 1 wherein means for delivering condensed coolant fluid from said condenser to said engine cooling jacket is a pump.

8. The system of claim 4 wherein the primary fluid for said jet ejector is the vaporized coolant effluent from said engine cooling jacket and the secondary fluid is the evaporated effluent from said heat exchanger means.

9. The system of claim 1 wherein said engine intake charge is compressed and heated by a turbocharger driven by the exhaust from said internal combustion engine and said compressed charge is cooled in said heat exchanger means.

10. The system of claim 1 wherein said fluid to be conditioned is cabin air.

11. The system of claim 2 wherein the flow and pressure of said second portion of condensed coolant into said heat exchanger is controlled by a throttle valve.

12. The engine system of claim 1 including an auxiliary cooler;
   means for delivering a portion of said condensed coolant fluid from said condenser means through said cooler for evaporation therein;
   a second fluid conveying means operating at a different secondary pressure ratio;
   means for conveying a portion of the coolant fluid vaporized in said engine cooling jacket to said second fluid conveying means; and
   means for returning co-mingled discharge from said second fluid conveying means to said condenser means.

13. An automotive engine cooling system for utilizing otherwise wasted heat from an engine to produce a cooling effect, comprising:
   a closed fluid circuit means;
   a turbocharged automotive engine including a cooling jacket thereon; an evaporative engine cooling fluid in said circuit means; condenser means for condensing said coolant fluid vaporized in said engine cooling jacket;
   engine charge cooling means;

means for conveying a minor portion of said condensed coolant from said condenser means to said charge cooling means to effect evaporation of said condensed coolant portion in said charged cooling means at a lower pressure to create a cooling effect for the engine charge in heat exchange relationship with said evaporated coolant in said engine charge cooling means;

means for conveying a major portion of said condensed coolant fluid from said condenser at a higher pressure to said engine cooling jacket whereby to cool said engine and vaporize said coolant fluid; and means for utilizing said vaporized cooling jacket effluent as a motive fluid for conveying said coolant evaporated in said charge cooling means into said condenser.

14. The system of claim 13, wherein said means for conveying evaporated coolant from said charge cooling means is a jet ejector.

15. The system of claim 14 including means for varying the fluid flow through said jet ejector.

16. The system of claim 15 wherein said flow varying means includes a plug valve movably disposed in the primary nozzle of said ejector.

17. The system of claim 14 including an auxiliary cooler; means for delivering a portion of said condensed coolant fluid from said condenser means through
    said cooler for evaporation therein;
    a second jet ejector operating at a different secondary pressure ratio;
    means for conveying a portion of the coolant fluid vaporized in said engine cooling jacket to said second ejector; and
    means for returning co-mingled discharge from said second ejector to said condenser means.

* * * * *